United States Patent [19]

Szlaga

[11] Patent Number: 5,116,257
[45] Date of Patent: May 26, 1992

[54] TANK VENTING CONTROL ASSEMBLY

[75] Inventor: Emil Szlaga, Connersville, Ind.

[73] Assignee: Stant Inc., Connersville, Ind.

[21] Appl. No.: 638,787

[22] Filed: Jan. 8, 1991

[51] Int. Cl.⁵ .............................................. F16K 17/36
[52] U.S. Cl. ........................................ 137/43; 137/493; 137/494; 137/587; 220/746
[58] Field of Search ................. 137/43, 493, 494, 587; 220/85 VR, 85 VS

[56] References Cited

U.S. PATENT DOCUMENTS

| | | | |
|---|---|---|---|
| 2,819,729 | 1/1958 | MacGregor | 137/587 X |
| 4,699,638 | 10/1987 | Harris | 55/168 |
| 4,714,172 | 12/1987 | Morris | 220/85 VS X |
| 4,787,529 | 11/1988 | Harris | 220/203 |
| 4,790,349 | 12/1988 | Harris | 137/587 |
| 4,816,045 | 3/1989 | Szlaga et al. | 55/168 |
| 4,883,103 | 11/1989 | Szlaga et al. | 141/368 |
| 4,953,583 | 9/1990 | Szlaga | 137/118 |

Primary Examiner—Robert G. Nilson

[57] ABSTRACT

An apparatus is provided for controlling discharge of fuel vapor and liquid fuel through an aperture in a fuel tank. The apparatus comprises a housing mounted in the aperture and formed to include a venting outlet, and a blocking mechanism for blocking the flow of fuel vapor through the venting outlet. The apparatus also includes a mechanism for using pressurized fuel vapor from the fuel tank to move the blocking mechanism from a flow-blocking position to a flow-delivery position. The using mechanism includes a diaphragm appended to the blocking means for movement therewith. The apparatus further includes a second mechanism for using fuel vapor discharged from the fuel tank to provide a pressure cushion acting against the diaphragm to urge the diaphragm from its second position toward its first position.

72 Claims, 4 Drawing Sheets

TANK VENTING CONTROL ASSEMBLY

BACKGROUND AND SUMMARY OF THE INVENTION

The present invention relates to tank pressure control systems and particularly to an apparatus for controlling flow of fuel vapor and liquid fuel through an aperture in a fuel tank. More particularly, the present invention relates to a tank venting control assembly that closes automatically to prevent discharge of fuel vapor and liquid fuel from the fuel tank during refueling, agitation of the tank, or vehicle rollover, while opening automatically to allow discharge of fuel vapor with minimum discharge of liquid fuel during normal operation of the vehicle.

Controlling fuel vapor pressure in vehicle fuel tanks has long been an objective for automobile manufacturers and suppliers of fuel systems components. Fuel vapor can be created in the fuel tank by temperature differences between the fuel tank and liquid fuel from a fuel pump, as well as by sloshing and agitation of the fuel tank during normal vehicle operation. The pressure build-up resulting from the creation of new fuel vapors must be properly relieved. For this reason, some vehicle fuel systems are equipped with pressure relief valves capable of discharging a relatively large amount of fuel vapor through an outlet which is typically of relatively small diameter due to limitations on space available in the vicinity of the fuel tank.

Once the fuel vapor has been discharged from the fuel tank, the vapor must be adequately captured and stored to assure compliance with air pollution regulations. In some vehicle fuel systems, discharged fuel vapor is exhausted to a charcoal-filled vapor recovery canister designed to capture and store fuel vapor. These so-called "on-board" fuel vapor recovery systems are disclosed, e.g., in U.S. Pat. Nos. 4,770,677; 4,816,045; and 4,836,835.

The attempt to achieve high fuel vapor flow rates has spawned a number of collateral problems in the design of venting control assemblies for fuel systems. One major problem with high flow capacity closure assemblies is that they tend to allow liquid fuel carryover. That is, droplets of liquid fuel become entrained in fuel vapor upon sloshing or agitation of the fuel tank and are discharged through the discharge orifice.

Liquid fuel carryover is undesirable for a number of reasons. For instance, the liquid droplets can be deposited in the vapor recovery canister, where they are likely to impair the canister's effectiveness in capturing fuel vapor.

In addition, it has long been appreciated that venting control assemblies should provide means for preventing liquid fuel leakage during tilting or rollover of the vehicle (see, e.g., U.S. Pat. Nos. 4,351,350; 4,655,238; 4,760,858). However, venting control assemblies allowing discharge of high mass flow rates of fuel vapor should also provide means for reducing discharge of liquid fuel even when the fuel tank is in its normal, upright position.

Further, it is important that venting control assemblies provide means for rapidly adjusting between fuel vapor venting and fuel vapor retaining positions. For example, it may be important to adjust quickly from a fuel vapor venting configuration to a fuel vapor retaining position in response to a rapid change in operating conditions of the vehicle.

According to the present invention, an apparatus is provided for controlling flow of fuel vapor and liquid fuel through an aperture in a fuel tank. The apparatus includes a housing mounted in the aperture and formed to include a venting outlet, and means for selectively blocking discharge of fuel vapor and liquid fuel through the venting outlet. The blocking means is movable between a flow-blocking position closing the venting outlet and flow-delivery position opening the venting outlet.

The apparatus further includes first means for using pressurized fuel vapor in the fuel tank to move the blocking means from the flow-blocking position to the flow-delivery position. The using means includes a diaphragm appended to the blocking means for movement therewith. The diaphragm is movable between a first position allowing the blocking means to assume its flow-blocking position and a second position moving the blocking means to its flow-delivery position.

The apparatus further includes second means for using fuel vapor discharged from the fuel tank through the venting outlet to provide a pressure cushion acting against the diaphragm. The pressure cushion facilitates movement of the diaphragm from its second position to its first position, thereby minimizing the possibility that the blocking means will improperly remain in a flow-delivery position under conditions in which continued venting of fuel vapor is not desired.

In operation of the apparatus of the present invention during normal vehicle operation with the fuel cap installed on the filler neck, fuel vapor pressure is communicated to the diaphragm and builds up until it is sufficient to move the diaphragm from the first to the second position. Movement of the diaphragm to the second position in turn causes the blocking means to move to the flow-delivery position, thus allowing fuel vapor to vent through the venting outlet. Before this discharged fuel vapor is carried away to an outlet passageway, the fuel vapor momentarily accumulates in the second using means. As additional fuel vapor is accumulated, the fuel vapor pressure rises sufficiently to return the diaphragm to its first position. Advantageously, the second using means creates a pressure cushion underneath the diaphragm to insure that the diaphragm is able to return to its first position, thus allowing the blocking means to return to its flow-blocking position blocking discharge of fuel vapor through the venting outlet.

The apparatus also includes a venting control chamber in the housing and means for communicating fuel vapor from the fuel tank to the venting control chamber. The diaphragm is mounted so that a portion of the diaphragm is exposed to pressure extant in the venting control chamber. Pressurized fuel vapor can travel from the fuel tank into the venting control chamber through the communicating means. Whenever the pressurized fuel vapor extant in the venting control chamber has a pressure in excess of a predetermined threshold level, that pressure will apply a force to the diaphragm causing the blocking means to move to its flow-delivery position opening the venting outlet. As a result, pressurized fuel vapor in the fuel tank is able to escape from the fuel tank through the venting outlet.

In preferred embodiments, the apparatus also includes a float valve buoyantly supported in liquid fuel introduced into the fuel tank and arranged to block flow of pressurized fuel vapor from the fuel tank into the venting control chamber through the communicating means. The float valve is configured to move to a position closing the communicating means upon accumulation of a sufficient volume of liquid fuel in the fuel tank. The float valve is also configured to function as a rollover valve so that it is able to move to a closed position to block flow of liquid fuel through the communicating means at least during rollover of a vehicle containing the fuel tank.

Additional objects, features, and advantages of the invention will become apparent to those skilled in the art upon consideration of the following detailed description of preferred embodiments exemplifying the best mode of carrying out the invention as presently perceived.

DETAILED DESCRIPTION OF THE DRAWINGS

Figure 1:
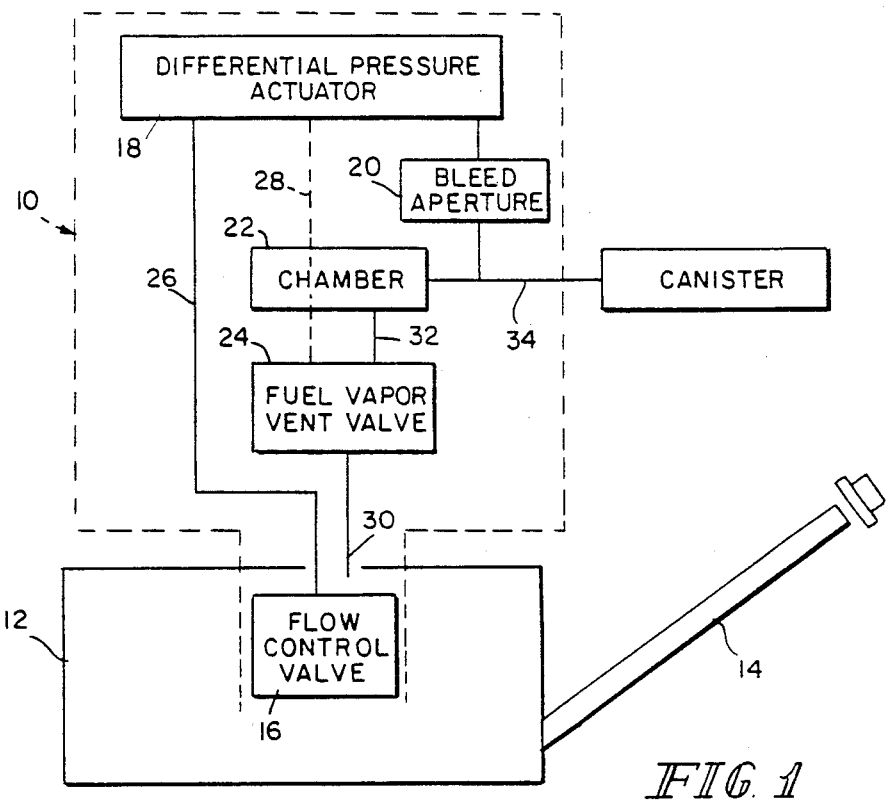
FIG. 1 is a schematic representation of a tank venting control assembly in accordance with the present invention.

A schematic representation of a tank venting control assembly in accordance with the present invention is provided in FIG. 1. Essentially, the assembly controls venting of fuel vapor from the fuel tank by using pressure provided by fuel vapor itself. The assembly facilitates tank venting by providing a flow path through which fuel vapor can escape from the fuel tank to a fuel vapor treatment canister. In addition, the assembly controls tank venting by providing a fuel vapor vent valve or other blocking means positioned to block the flow path when retention of fuel vapor in the fuel tank is desired and to unblock the flow path when venting of fuel vapor from the fuel tank is desired. Advantageously, it is the pressure of the fuel vapor itself that controls movement of the blocking means from the blocking position to the unblocking position.

More specifically, with reference to FIG. 1, a tank venting control assembly 10 is shown to be mounted in a fuel tank 12 provided with a filler neck 14. Assembly 10 includes a flow control valve 16, a differential pressure actuator 18, a bleed aperture 20, a chamber 22, and a fuel vapor vent valve 24.

In operation of the assembly during refueling of the vehicle, fuel vapor is prevented from entering a flow passageway 26 by flow control valve 16, which moves to a flow-blocking position in response to the accumulation of liquid fuel in the fuel tank in excess of a predetermined amount. With flow path 26 blocked, differential pressure actuator 18 is isolated from exposure to fuel vapor. Since differential pressure actuator 18 is appended to fuel vapor vent valve 24 as represented by broken line 28, valve 24 likewise remains in a position preventing fuel vapor from flowing from a flow passageway 30 to a flow passageway 32. Thus, fuel vapor collects in fuel tank 12. As additional liquid fuel is added to fuel tank 12, the pressure exerted by this collected fuel vapor eventually becomes sufficient to displace the liquid fuel in reverse flow up the filler neck to actuate a shut-off mechanism provided on the fuel filler nozzle.

In operation of assembly 10 during operation of the vehicle, flow control valve 16 moves in response to decreasing liquid fuel levels to a position allowing fuel vapor to flow from fuel tank 12 through flow passageway 26 to reach differential pressure actuator 18. When the fuel vapor pressure acting against differential pressure actuator 18 reaches a predetermined amount, the actuator 18 acts through connection 28 to move fuel vapor vent valve 24 to a position allowing flow of fuel vapor from flow passageway 30 to flow passageway 32 and thence to chamber 22.

From chamber 22, the fuel vapor can pass at a predetermined rate to a flow passageway 34 providing an exhaust outlet. Flow passageway 34 leads to a vapor recovery canister or similar vapor treatment apparatus.

Advantageously, chamber 22 is configured to maintain the outlet flow rate of fuel vapor to flow passageway 34 at a lower level than the inlet flow rate to chamber 22 from flow passageway 32. This creates a non-steady state condition with respect to flow of fuel vapor through chamber 22, such that fuel vapor (and, hence, fuel vapor pressure) accumulates in chamber 22 up to a predetermined amount. The fuel vapor pressure in chamber 22 acts against differential pressure actuator 18 to assist in moving actuator 18 back to its original position, which also allows fuel vapor vent valve 24 to return to a position blocking the flow of fuel vapor from flow passageway 30 to flow passageway 32.

In addition, bleed aperture 20 provides means for very gradually dissipating fuel vapor pressure that would otherwise act against differential pressure actuator 18. Dissipation of pressure via bleed aperture 20 allows the accumulated pressure in chamber 22 to more easily return differential pressure actuator 18 to its original position.

Figure 2:
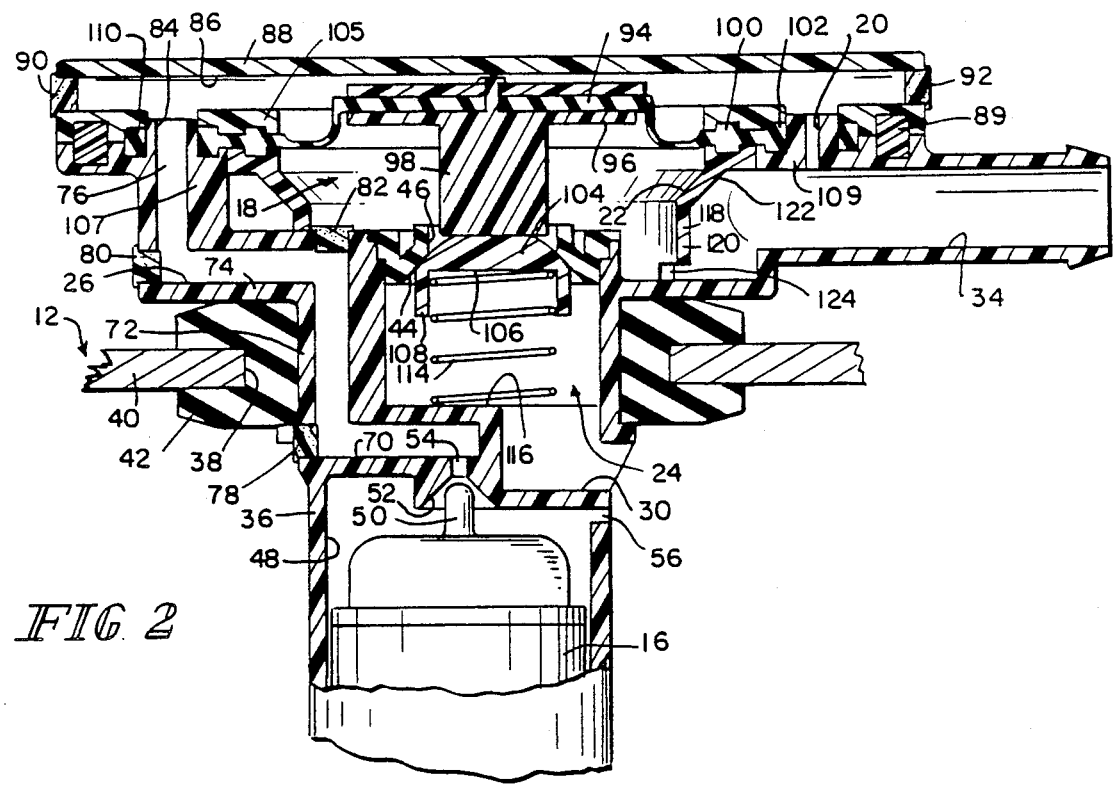
FIG. 2 is a sectional view of one embodiment of a tank venting control assembly in accordance with the present invention.
Figure 3:
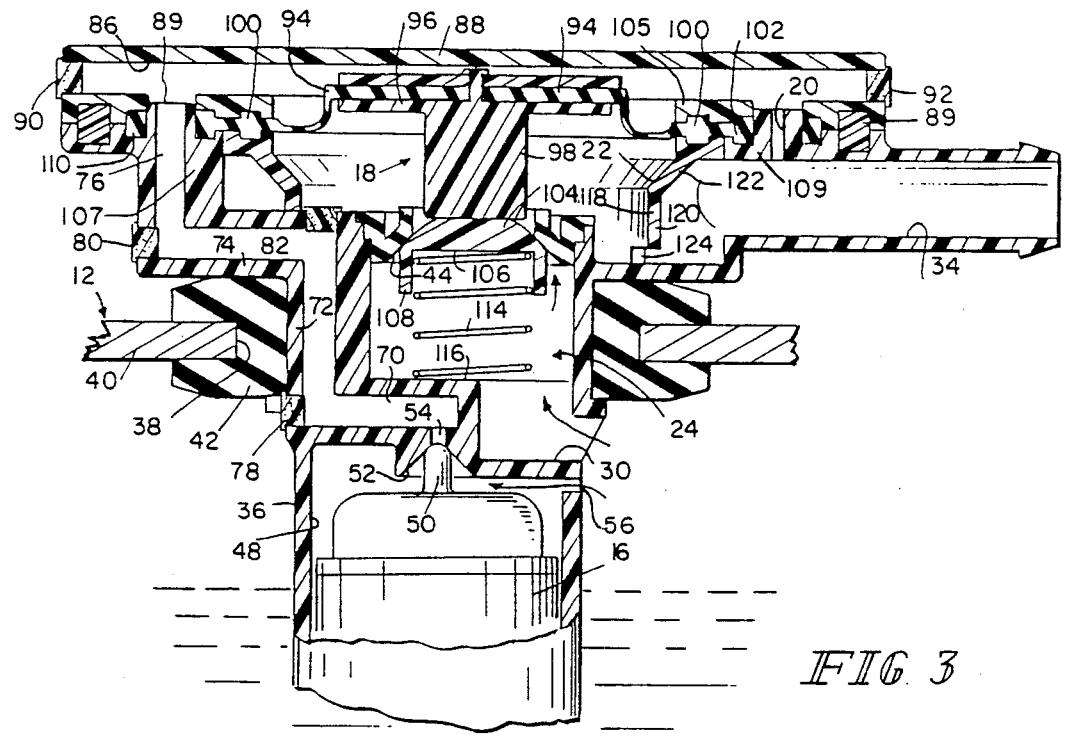
FIG. 3 is a sectional view of the assembly of FIG. 2 showing the fuel vapor vent valve in a flow-blocking position and the flow control valve in a closed positioned when the fuel cap is off the fuel tank filler neck as during refueling.
Figure 4:
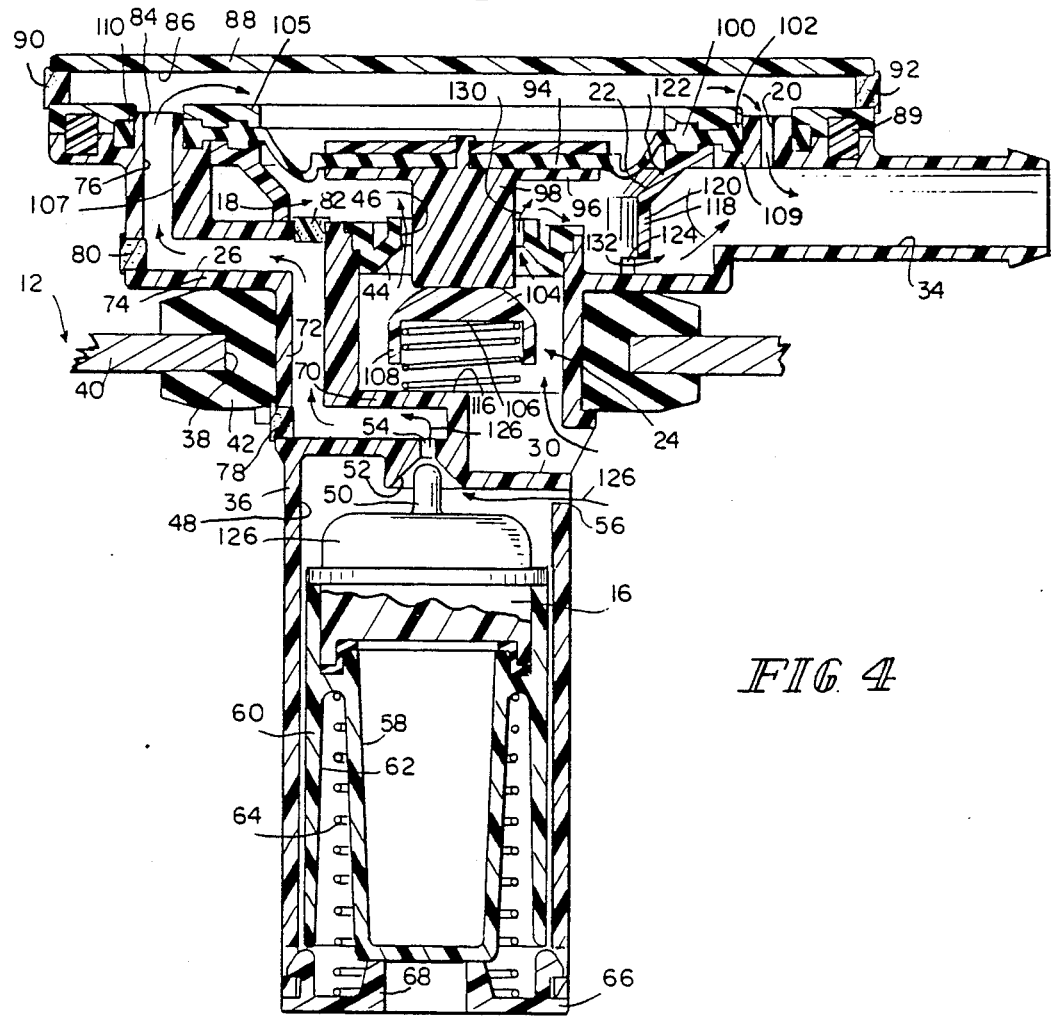
FIG. 4 is a sectional view of the assembly of FIG. 2 showing the fuel vapor vent valve in a flow-delivery position and the flow control valve in an open position when the fuel cap is on the fuel tank filler neck as during normal vehicle operation.

One embodiment of a tank venting control assembly in accordance with the present invention is illustrated in FIGS. 2-4. As shown in FIGS. 2-4, the illustrated embodiment includes a housing 36 mounted in an aperture 38 formed in a wall 40 of fuel tank 12. A gasket 42 is provided to prevent the escape of fuel vapor through aperture 38 around housing 36. Housing 36 includes a valve seat 44 providing a venting outlet 46.

The assembly also includes flow control valve 16. As shown, housing 36 is formed to include a valve chamber 48 sized to receive flow control valve 16 for movement therein. Flow control valve 16 can be a spring-supported float valve as shown in more detail in FIG. 4 or any of a variety of flow control valves which are responsive to changes in the level of liquid fuel in the fuel tank regardless of the attitude of the vehicle. Advantageously, flow control valve 16 is of a type which will also function as a rollover shut-off valve preventing fuel vapor and liquid fuel from leaking out of the fuel tank during vehicle tilting or inversion.

Flow control valve 16 is provided with a nipple 50. A valve seat 52 is sized to receive nipple 50 in sealing engagement therewith to block the flow of fuel vapor from fuel tank 12 to an outlet 54. Thus, fuel vapor from fuel tank 12 entering valve chamber 48 by way of an inlet 56 formed in housing 36 is prevented from entering outlet 54 and is thus prevented from entering flow passageway 26. Flow control valve 16 thereby provides means for shutting off flow to flow passageway 26.

As shown in FIG. 4, flow control valve 16 can include a hollow float body 58 surrounded by an essentially cylindrical outer body portion 60. Float body 58 and outer portion 60 cooperate to define an annular recess 62 therebetween. A coil spring 64 extends into recess 62 to act between a retainer 66 and flow control valve 16 to assist in moving flow control valve 16 to a position in which nipple 50 seats against valve seat 52. An annular platform 68 is provided on retainer 66 and is sized to allow float body 58 to rest thereon when flow control valve 16 is in the position illustrated in FIG. 4.

Flow passageway 26 formed in housing 36 provides means for communicating fuel vapor from valve chamber 48 to differential pressure actuator 18. Flow passageway 26 is shown to include several segments 70, 72, 74, 76, each segment lying essentially perpendicular to the adjacent segment. Flow passageway 26 is preferably formed in this manner to facilitate molding of the part. Conveniently, passageway segments are bored either perpendicular to, or parallel to, the longitudinal extent of housing 36 and plugs 78, 80, 82 inserted appropriately to block flow of fuel vapor through the bore holes.

Passageway 26 outlets at end 84 to a venting control chamber 86. Venting control chamber has as its upper boundary a cap 88 appended to housing 36 and, as its lower boundary, differential pressure actuator 18. Gaskets 89, 110 are provided between housing 36 and cap 88 to prevent the escape of vapor. Plugs 90, 92 are provided between the upper portion of housing 36 and cap 88 to prevent the escape of fuel vapor from venting control chamber 86. In addition, a bleed aperture 20 is formed in housing 36 to communicate fuel vapor between venting control chamber 86 and flow path 34 to the vapor recovery canister.

Differential pressure actuator 18 includes a diaphragm 94 positioned for exposure to fuel vapor in venting control chamber 86 and a backing plate 96 appended to diaphragm 94 for movement therewith. Backing plate 96 has a depending stem 98 extending to contact fuel vapor vent valve 24.

Diaphragm 94 includes annular ridges 100, 102 adapted to be sandwiched between a ring portion 105 of cap 88 and portions 107, 109 of housing 36 so that diaphragm 94 is securely mounted within housing 36. Diaphragm 94 is movable between a first position (illustrated in FIGS. 2 and 3) and a second position (illustrated in FIG. 4) in response to variations in the fuel vapor pressure in venting control chamber 86.

Since depending stem 98 of differential engages fuel vapor vent valve 24, differential pressure actuator 18 provides means for using pressurized fuel vapor received in venting control chamber 86 from fuel tank 12 to move a valve member 104 from a flow-blocking position illustrated in FIGS. 2-3 (preventing fuel vapor in flow passageway 30 from flowing through venting outlet 46) to a flow-delivery position illustrated in FIG. 4 (allowing fuel vapor in flow passageway 30 to flow through venting outlet 46).

Fuel vapor vent valve 24 is shown to include an inverted cup or valve member 104 engaged by depending stem 98 and sized to seat against valve seat 44 to block flow of fuel vapor through venting outlet 46. Although valve member 104 is illustrated as including a flat interior surface 106 exposed to fuel vapor from the tank and an essentially cylindrical depending portion 108, alternative configurations are contemplated as within the scope of the present invention. For example, valve member 104 might include a depending post appended to interior surface 106. In addition, housing 36 might be provided with a plurality of ribs extending into flow passageway 30 about the periphery of valve member 104. The ribs and center stem function to ensure that valve member 104 maintains its proper orientation during movement in flow passageway 30 between the flow-blocking and flow-delivery positions.

Fuel vapor vent valve 24 also includes a spring 114 acting between a base 116 and an interior surface 106 of valve member 104 to normally bias valve member 104 from its flow-delivery position toward its flow-blocking position illustrated in FIG. 2-3. Essentially, then, fuel vapor vent valve 24 provides means for selectively blocking discharge of fuel vapor and liquid fuel through venting outlet 46.

The assembly also includes a skirt 118 cooperating with diaphragm 94 to define fuel vapor accumulation chamber 22. In the embodiment illustrated in FIGS. 2-4, skirt 118 includes an essentially cylindrical lower portion 120 and an inverse conical upper portion 122. Lower portion 122 is formed to include a plurality of openings 124 sized to allow discharge of fuel vapor therethrough to flow passageway 34 at a predetermined rate.

Advantageously, fuel vapor is received in chamber 22 via venting outlet 46 at a rate higher than that at which fuel vapor is vented from chamber 22 through openings 124. Thus, skirt 118 provides means for accumulating a reservoir of fuel vapor in chamber 22 to supply a pressure against diaphragm 94 in opposition to the pressure exerted on diaphragm 94 by fuel vapor in venting control chamber 86. That is, skirt 118 provides means for using fuel vapor discharged through venting outlet 46 to provide a "pressure cushion" to urge diaphragm 94 from its second position (illustrated in FIG. 4) to its first position (illustrated in FIGS. 2-3). Openings 124 serve as means for metering or regulating discharge of fuel vapor from chamber 22 to facilitate creation of the pressure cushion. The provision of this pressure cushion minimizes the potential for the diaphragm improperly to remain in its first position.

Operation of the assembly is illustrated in FIGS. 3-4. In FIG. 3, the assembly is shown during refueling of the vehicle with the fuel cap off of filler neck 14 and a relatively high level of liquid fuel present in fuel tank 12. As shown, flow control valve 16 floats on the liquid fuel in fuel tank 12 to a position at which nipple 50 seats against valve seat 52 to prevent fuel vapor from flowing through outlet 54 to flow passageway 26. Flow passageway 26, and hence venting control chamber 86, are thus isolated from fuel vapor pressure in tank 12.

Because the vapor recovery canister outlets to the atmosphere, the pressure in flow passageway 34 is essentially atmospheric. Thus, the pressures in chamber 22 and venting control chamber 86 are also essentially atmospheric.

On the other hand, fuel vapor from the fuel tank can enter flow passageway 30 to supply a force to valve member 104 in addition to the force already provided by spring 114. Thus, valve member 104 assumes its flow-blocking position blocking the flow of fuel vapor through venting outlet 46, thereby retaining a blanket of fuel vapor in fuel tank 12 to prevent an operator from overfilling fuel tank 12 as has been previously described.

In FIG. 4, the assembly is shown during normal operation of the vehicle with the fuel cap on. As shown, fuel vapor can enter valve chamber 48 via inlet 56 and flow through outlet 54 (as indicated by arrows 126) because flow control valve 16 is in a position in which nipple 50 is out of engagement with valve seat 52.

Fuel vapor can then pass through flow passageway 26 past end 84 to reach venting control chamber 86 as indicated by arrow 128. Some fuel vapor will pass through venting control chamber 86 and immediately exit through bleed aperture 20, but this represents only a small fraction of the fuel vapor received in venting control chamber 86. The majority of the fuel vapor exerts pressure against diaphragm 94. The pressure eventually becomes sufficient to move diaphragm 94 away from the position illustrated in FIG. 3 toward the position illustrated in FIG. 4, thus moving valve member 104 against the bias of spring 114 to place valve member 104 in the flow-delivery position illustrated in FIG. 5.

Such movement is possible in spite of the fact that the pressure in venting control chamber 86 acting to move diaphragm 94 to the position illustrated in FIG. 4 is essentially equal to the pressure acting against surface 106 of valve member 104. The surface area of diaphragm 94 is much greater than that of surface 106. Thus, a greater force is applied to diaphragm 94 than is applied to surface 106.

When the assembly is thus positioned, fuel vapor can flow from passageway 30 through outlet 46 into chamber 22 as indicated by arrows 130. Some fuel vapor will flow through openings 124 to reach passageway 34 as indicated by arrows 132. However, openings 124 are sized to restrict outlet flow of fuel vapor so that fuel vapor accumulates in chamber 22 to provide a pressure acting against backing plate 96 appended to diaphragm 94.

As fuel vapor is vented from fuel tank 12 to chamber 22 via outlet 46, the pressure of fuel vapor in chamber 22—that is, the pressure acting against the underside of diaphragm 94—is gradually increasing. The fuel vapor pressure in venting control chamber 86—that is, the pressure acting against the upper side of the diaphragm—remains relatively constant, although a gradual decrease in pressure might be observed due to fuel vapor bleeding through bleed aperture 20. Thus, the pressure in chamber 22 cushions diaphragm 94 and eventually supplies a force sufficient to move diaphragm 94 back to the position illustrated in FIGS. 2-3. The fuel vapor which does escape through openings 124 passes to flow passageway 34. From there, the fuel vapor flows to the vapor recovery canister as has been previously described.

Figure 5:
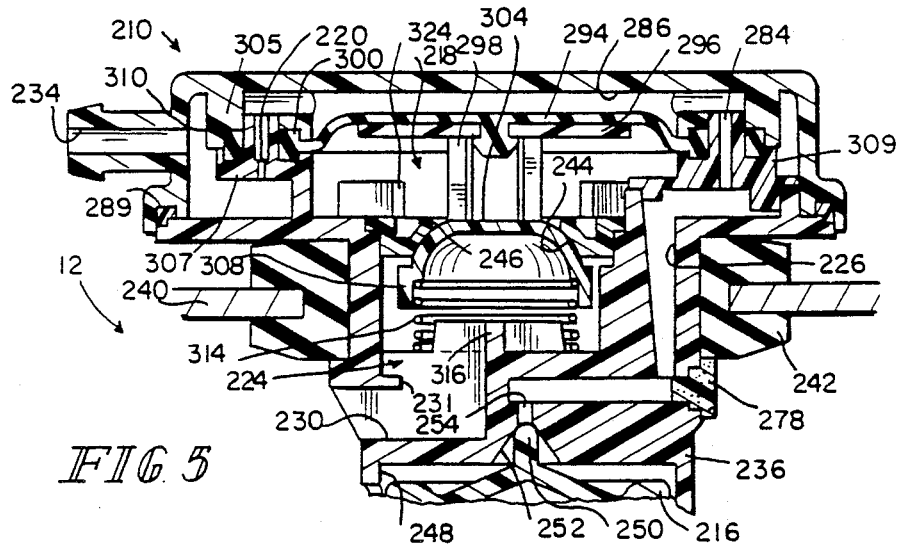
FIG. 5 is a sectional view of another embodiment of a tank venting control assembly in accordance with the present invention showing the fuel vapor vent valve in its flow-blocking position and the flow control valve in its closed position during refueling.
Figure 6:
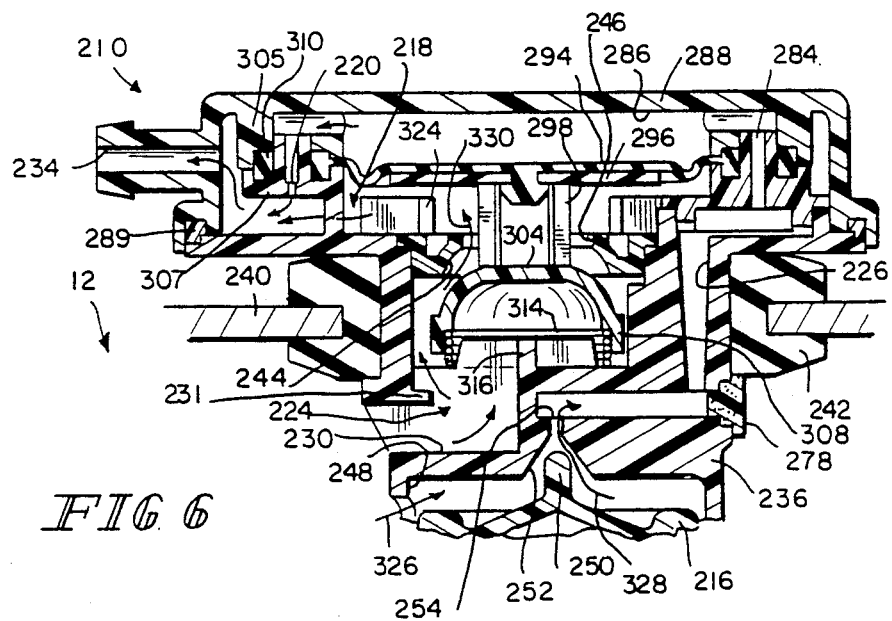
FIG. 6 is a sectional view of the assembly of FIG. 5 showing the fuel vapor vent valve in its flow-delivery position and the flow control valve in its open position during normal vehicle operation.

Another embodiment of a tank venting control assembly in accordance with the present invention is illustrated in FIGS. 5-6. Reference numbers similar to those in FIGS. 2-4 refer to parts which perform the same or similar function as do the parts in FIGS. 2-4.

In FIG. 5, operation of a tank venting assembly 210 in accordance with the present invention is illustrated during refueling. Flow control valve 216 floats on liquid fuel to a position at which nipple 250 seats against valve seat 252 to prevent fuel vapor from flowing through outlet 254 to flow passageway 262. Flow passageway 262, and hence venting control chamber 286, are thus isolated from fuel vapor pressure in tank 12.

Because the canister is exposed to atmospheric pressure, the pressure in canister flow passageway 234 and thus, in chamber 222 is essentially atmospheric. On the other hand, fuel vapor from the fuel tank can enter flow Passageway 230 to supply a force to valve member 304 in addition to that already supplied by spring 314. Thus, valve member 304 assumes a flow-blocking position blocking the flow of fuel vapor through venting outlet 246 and thereby retaining a blanket of fuel vapor in fuel tank 212 to prevent an operator from overfilling the tank as has been Previously described.

Advantageously, housing 236 is also provided with a shelf 231 projecting into flow passageway 230. Shelf 231 serves as a liquid vapor flow separator as liquid fuel droplets entrained in fuel vapor tend to be deposited on shelf 231.

In FIG. 6, assembly 210 is shown during normal operation of the vehicle. As indicated by arrows 326, fuel vapor can enter valve chamber 248 and flow through outlet 254 because nipple 250 is out of engagement with valve seat 252. Fuel vapor can then Pass through flow passageway 226 to reach venting control chamber 286 as indicated by arrow 328. Some fuel vapor will exit chamber 286 via bleed aperture 220, but the majority of the fuel vapor will exert a pressure against diaphragm 294 to move diaphragm 294 such that depending stem 298 engages and moves valve member 304 against the bias of spring 314 to Place valve member 304 in a flow-delivery position.

Fuel vapor will flow as designated by arrows 330 through outlet 246 into chamber 222. Some fuel vapor will flow through openings 324 to reach passageway 234 and pass to the vapor recovery canister. The remainder will accumulate in chamber 222 to form a pressure cushion for diaphragm 294 to assist in moving diaphragm 294 back to the position illustrated in FIG. 5.

Figure 7:
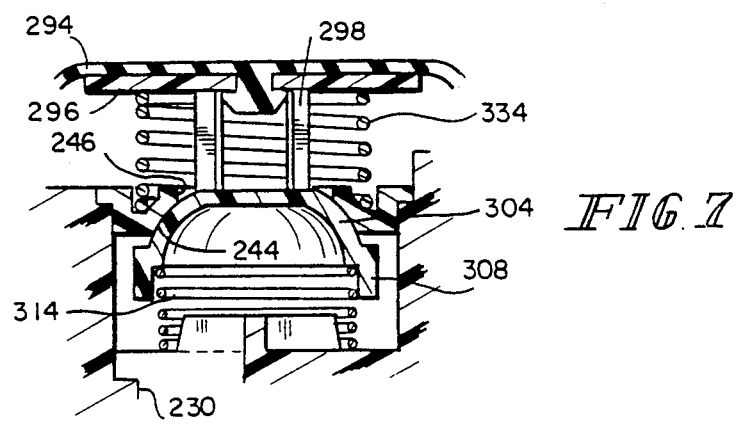
FIG. 7 is a sectional view of yet another embodiment of a tank venting control assembly in accordance with the present invention including a spring positioned beneath the diaphragm.

For some applications, it is anticipated that it may be desirable to add additional force beyond that supplied by the pressure cushion to return diaphragm 294 to the position illustrated in FIG. 5. To accomplish this, a spring 334 can be added to assembly 210 as indicated in FIG. 7. Spring 334 acts between a surface 336 and backing plate 296 appended to diaphragm 294.

Figure 8:
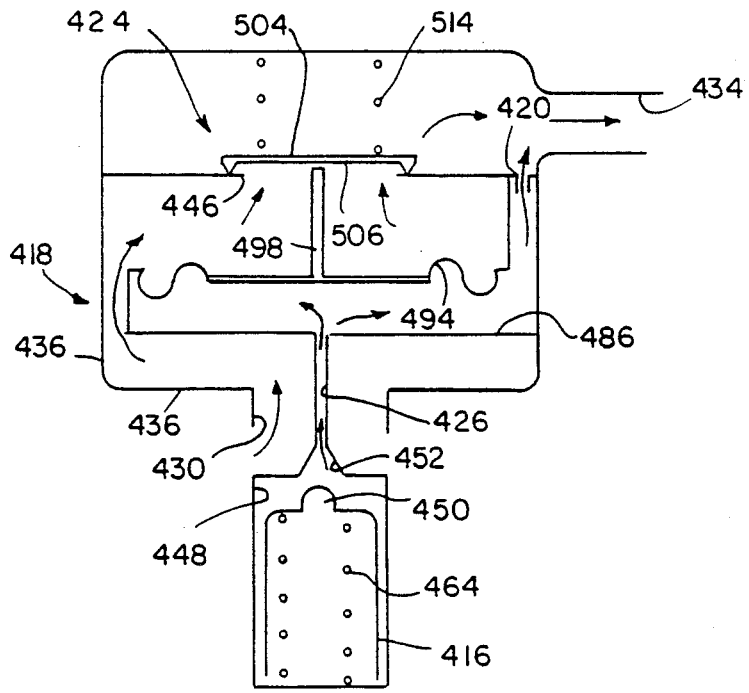
FIG. 8 is a schematic representation of yet another embodiment of a tank venting control assembly in accordance with the present invention showing a differential pressure actuator positioned between the fuel vapor vent valve and the flow control valve.
Figure 9:
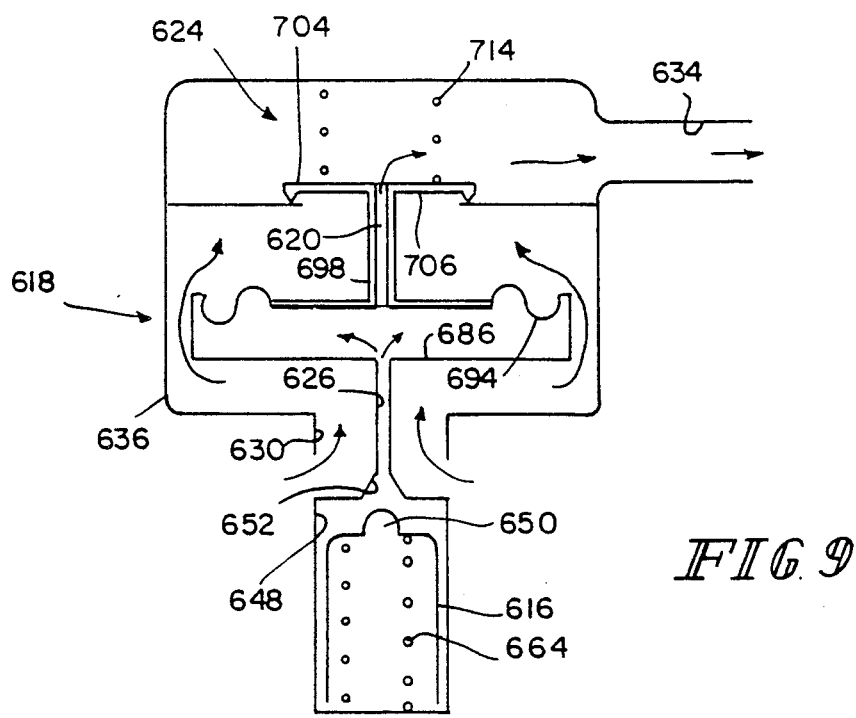
FIG. 9 is a schematic representation of yet another embodiment of a tank venting control assembly in accordance with the present invention showing a differential pressure actuator positioned between the fuel vapor vent valve and the flow control valve, the differential pressure actuator being affixed to the fuel vapor vent valve.

The schematics of FIGS. 8 and 9 show additional embodiments of tank venting control assembly incorporating means for using pressurized fuel vapor in the fuel tank having a pressure in excess of a predetermined threshold level to exert an opening force on a valve member or blocking means in opposition to a biasing means. Reference numbers similar to those in previous drawings refer to parts performing the same or similar function as do the parts in the previous drawings.

In FIG. 8, a flow control valve 416 biased by a spring 464 is movable to a position in which nipple 450 engages valve seat 452 to prevent fuel vapor from flowing into passageway 426 to reach a venting control chamber 486. In addition, a valve member 504 is biased by a spring 514 to a flow-blocking position preventing flow of fuel vapor through venting outlet 446.

In operation of the assembly of FIG. 8 during refueling, flow control valve 416 prevents diaphragm 494 from being exposed to pressurized fuel vapor by blocking flow of fuel vapor through outlet 454. Fuel vapor can act against underside 506 of valve member 504, but cannot supply a force sufficient to overcome the biasing force of spring 514. Thus, valve member 504 remains in a flow-blocking position.

In operation of the assembly during vehicle operation, flow control valve allows flow of fuel vapor through flow passageway 426 to reach venting control chamber 486 and there act on diaphragm 494, moving diaphragm to a position at which stem 498 engages valve member 504. Fuel vapor can then flow through venting outlet 446 to reach passageway 434 leading to the vapor recovery canister.

The assembly of FIG. 9 operates in essentially the same fashion as does that of FIG. 8. In the assembly of FIG. 9, however, stem 698 is formed to include a passageway serving as bleed aperture 620. Fuel vapor in venting control chamber 686 escapes through aperture 620 in much the same fashion as fuel vapor gradually bleeds away from chamber 486 via bleed aperture 420.

Although the invention has been described in detail with reference to certain preferred embodiments, variations and modifications exist within the scope and spirit of the invention as described and defined in the following claims.

What is claimed is:

1. An apparatus for controlling discharge of fuel vapor and liquid fuel through an aperture in a fuel tank, the apparatus comprising
a housing mounted in the aperture, the housing being formed to include a venting outlet,
means for selectively blocking discharge of fuel vapor and liquid fuel through the venting outlet, the blocking means being movable between a flow-blocking position closing the venting outlet and a flow-delivery position opening the venting outlet,
first means for using pressurized fuel vapor in the tank to move the blocking means from the flow-blocking position to the flow-delivery position, the using means including a diaphragm appended to the blocking means for movement therewith, the diaphragm being movable between a first position allowing the blocking means to assume its flow-blocking position and a second position moving the blocking means to its flow-delivery position, and
second means for using fuel vapor discharged from the fuel tank through the venting outlet to provide a pressure cushion acting against the diaphragm to urge the diaphragm from its second position forward to its first position.

2. The apparatus of claim 1, wherein the second means is formed to include a fuel vapor accumulation chamber receiving fuel vapor discharged from the fuel tank through the venting outlet and the diaphragm includes a first surface exposed to fuel vapor extant in the fuel vapor accumulation chamber.

3. The apparatus of claim 2, wherein the housing is formed to include an exhaust outlet and the second means is formed to include outlet means for metering discharge of fuel vapor from the fuel vapor accumulation chamber to the exhaust outlet so that a reservoir of fuel vapor having a pressure in excess of a predetermined level is created in the fuel vapor accumulation chamber to provide said pressure cushion.

4. The apparatus of claim 2, wherein the housing is formed to include an exhaust outlet, the second means includes a wall defining a boundary of the fuel vapor accumulation chamber, and the wall is formed to include at least one aperture permitting fuel vapor flow between the fuel vapor accumulation chamber and the exhaust outlet.

5. The apparatus of claim 4, wherein the wall and the fist side of the diaphragm cooperate with the housing to define the boundary of the fuel vapor accumulation chamber.

6. The apparatus of claim 4, wherein at least one aperture in the wall is sized to provide means for regulating discharge of fuel vapor from the fuel vapor accumulation chamber to the exhaust outlet so that a reservoir of fuel vapor having a pressure in excess of a predetermined level is created in the fuel vapor accumulation chamber to provide said pressure cushion.

7. The apparatus of claim 2, wherein the housing is also formed to include a venting control chamber and means for connecting the venting control chamber to the fuel tank to permit fuel vapor extant in the fuel tank to develop in the venting control chamber and the diaphragm includes a second surface exposed to fuel tank fuel vapor extant in the venting control chamber.

8. The apparatus of claim 7, wherein the area of the first surface is about equivalent to the area of the second surface.

9. The apparatus of claim 8, wherein the blocking means includes a third surface exposed to fuel vapor in the fuel tank and the area of the third surface is less than the area of each of the first and second surfaces.

10. The apparatus of claim 7, wherein the connecting means extends into the fuel tank through the aperture formed in the fuel tank without passing through the venting outlet.

11. The apparatus of claim 7, further comprising means for shutting off flow of fuel vapor from the fuel tank to the venting control chamber in response to accumulation of liquid fuel in excess of a predetermined volume in the fuel tank wihtout blocking dishcarge of fuel vapor from the fuel tank into the fuel vapor accumulation chamber through the venting outlet so that the magnitude of pressure continues to increase in the fuel vapor accumulation chamber to exert a force urging the diaphragm from its second position toward its first position even though the magnitude of pressure in the venting control chamber remains stable.

12. The apparatus of claim 11, wherein the first means includes passageway means for connecting the venting control chamber to the exhaust outlet to bleed pressurized fuel vapor from the venting control chamber to the exhaust outlet at a predetermined rate.

13. The apparatus of claim 1. wherein the second means includes a skirt positioned between the diaphragm means and the blocking mean. the skirt being formed to include a plurality of openings sized to allow discharge of fuel vapor therethrough at a predetermined rate.

14. The apparatus of claim 1, wherein the second using means includes a cylindrical lower portion and a conical upper portion.

15. The apparatus of claim 14. wherein the cylindrical lower portion is formed to include a plurality of openings allowing discharge of fuel vapor therethrough.

16. The apparatus of claim 1, wherein the second using means defines a fuel vapor accumulation chamber receiving fuel vapor discharged from the fuel through the venting outlet, the diaphragm means includes means for engaging the blocking means, and the engaging means extends into the fuel vapor accumulation chamber to communicate with the blocking means.

17. The apparatus of claim 1. further including first means for yieldably biasing the blocking means toward its flow-blocking position.

18. The apparatus of claim 17, wherein the first biasing means is calibrated to allow the blocking means to move to its flow-delivery position when the fuel vapor pressure in the fuel tank falls below a predetermined level so that the venting outlet is opened to allow air extant in the housing to pass into the fuel tank.

19. The apparatus of claim 1, further including second means for yieldably biasing the diaphragm toward its first position.

20. The apparatus of claim 19, wherein the second using means defines a fuel vapor accumulation chamber and the second biasing means is positioned in the fuel vapor accumulation chamber.

21. An apparatus for controlling discharge of fuel vapor and liquid fuel through an aperture in a fuel tank, the apparatus comprising
 a housing mounted in the aperture. the housing being formed to include a venting outlet,
 means for selectively preventing fuel vapor from flowing through the venting outlet, the preventing means including a valve member and means for using fuel vapor pressure from the fuel tank to move the valve member to a position allowing flow of fuel vapor through the venting outlet, and
 means for accumulating fuel vapor underneath the using means to provide a pressure cushion to assist in moving the preventing means to a position preventing flow of fuel vapor through the venting outlet.

22. The apparatus of claim 21, wherein the using means includes a diaphragm movable to engage and move the valve member to its venting position, the accumulating means is formed to include a fuel vapor accumulation chamber receiving fuel vapor discharged from the fuel tank through the venting outlet and the diaphragm includes a first surface exposed to fuel vapor extant in the fuel vapor accumulation chamber.

23. The apparatus of claim 22. wherein the housing is formed to include an exhaust outlet and the accumulating means is formed to include outlet means for metering discharge of fuel vapor from the fuel vapor accumulation chamber to the exhaust outlet so that a reservoir of fuel vapor having a pressure in excess of a predetermined level is created in the fuel vapor accumulation chamber to provide said pressure cushion.

24. The apparatus of claim 23. wherein the housing is formed to include an exhaust outlet, the accumulating means includes a wall defining a boundary of the fuel vapor accumulation chamber. and the wall is formed to include at least one aperture permitting fuel vapor flow between the fuel vapor accumulation chamber and the exhaust outlet.

25. The apparatus of claim 24, wherein the wall and the first side of the diaphragm cooperate with the housing to define the boundary of the fuel vapor accumulation chamber.

26. The apparatus of claim 24. wherein the at least one aperture in the wall is sized to provide means for regulating discharge of fuel vapor from the fuel vapor accumulation chamber to the exhaust oulet so that a reservoir of fuel vapor ahving a pressure in excess of a predetermined level is created in the fuel vapor accumulation chamber to provide said pressure cushion.

27. The apparatus of claim 22, wherein the housing is also formed to include a venting control chamber and means for connecting the venting control chamber to the fuel tank to permit fuel vapor extant in the fuel tank to develop in the venting control chamber and the diaphragm includes a second surface exposed to fuel tank fuel vapor extant in the venting control chamber.

28. The apparatus of claim 27, wherein the area of the first surface is about equivalent to the area of the second surface.

29. The apparatus of claim 27. wherein the connecting means extends into the fuel tank through the aperture formed in the fuel tank without passing through the venting outlet.

30. The apparatus of claim 27. further comprising means for shutting off flow of fuel vapor from the fuel tank to the venting control chamber in response to accumulation of liquid fuel in excess of a predetermined volume in the fuel tank without blocking discharge of fuel vapor from the fuel tank into the fuel vapor accumulation chamber through the venting outlet so that the magnitude of pressure continues to increase in the fuel vapor accumulation chamber to exert a force urging the diaphragm from its second position toward its first position even though the magnitude of pressure in the venting control chamber remains stable.

31. The apparatus of claim 30. whereni the first means includes passageway means for connecting the venting control chamber to the exhaust outlet to bleed pressurized fuel vapor from the venting control chamber to the exhaust outlet at a predetermined rate.

32. The apparatus of claim 21. wherein the using means includes a diaphragm positioned for exposure to fuel vapor from the fuel tank.

33. The apparatus of claim 21, wherein the accumulating means includes a skirt formed to include a plurality of openings, the openings being sized to allow discharge of fuel vapor therethrough at a predetermined rate.

34. An apparatus for controlling discharge of fuel vapor and liquid fuel through an aperture in a fuel tank, the apparatus comprising
 a housing mounted in the aperture, the housing being formed in include a discharge orifice,
 a valve member sized to close the orifice and being movable between a flow-blocking position blocking flow of fuel vapor and liquid fuel through the discharge orifice and a flow-delivery position allowing flow of fuel vapor and liquid fuel through the discharge orifice, means for yieldably biasing the valve member toward its flow-blocking position, a diaphragm assembly positioned in engagement with the valve member, the diaphragm assembly being movable in response to exposure to fuel vapor pressure from the fuel tank between a first position placing the valve member in its flow-blocking position and a second position placing the valve member in its flow-delivery position, means for communicating fuel vapor to the diaphragm assembly, and a skirt positioned between the diaphragm assembly and the valve member and formed in include a plurality of openings sized to provide means for restricting flow of fuel vapor exiting the venting outlet so that a reservoir of fuel vapor is created to provide a pressure cushion acting against the diaphragm assembly to move it from its first to its second position.

35. The apparatus of claim 34, wherein the skirt defines an interior chamber and the diaphragm assembly includes a post extending into the interior chamber to engage the valve member.

36. The apparatus of claim 34, wherein the skirt includes a cylindrical lower portion and a conical upper portion.

37. The apparatus of claim 36, wherein the lower portion is formed to include a plurality of openings allowing passage of fuel vapor therethrough.

38. The apparatus of claim 34, further including means for yieldably biasing the diaphragm assembly toward its first position.

39. An apparatus for controlling discharge of fuel vapor and liquid fuel through an aperture in a fuel tank, the apparatus comprising a housing mounted in the aperture, the housing being formed to include a chamber and a discharge orifice positioned to communicate fuel vapor from the fuel tank to the chamber, means for selectively blocking flow of fuel vapor through the discharge orifice, the blocking means being movable between a flow-blocking position and a flow-delivery position, a diaphragm mounted in the chamber so as to partition the chamber into an upper portion and a lower portion, the lower portion lying in communication with the discharge orifice, the diaphragm being movable in response to exposure to fuel vapor pressure from the fuel tank between a first position placing the blocking means in its flow-blocking position and a second position placing the blocking means in its flow-delivery position, means for communicating fuel vapor from the fuel tank to the upper portion to move the diaphragm from the first position to the second position, and means for using fuel vapor pressure received in the lower portion from the discharge orifice to provide a pressure cushion to return the diaphragm to its first position from its second position.

40. The apparatus of claim 39, wherein the communicating means includes a wall cooperating with an inner wall of the housing to define a flow passageway, the flow passageway extending between the fuel tank and the upper portion separate of the discharge orifice.

41. The apparatus of claim 39, wherein the using means includes a skirt positioned between the diaphragm and the blocking means and formed to include a plurality of openings to allow flow of fuel vapor therethrough from the lower portion at a predetermined rate.

42. The apparatus of claim 39, wherein the using means includes a cylindrical lower portion and a conical upper portion.

43. The apparatus of claim 42, wherein the lower portion is formed to include a plurality of openings allowing discharge of fuel vapor therethrough.

44. The apparatus of claim 43, wherein the using means is formed to include an opening and the apparatus further includes a post extending between the diaphragm and the blocking means so that movement of the diaphragm moves the blocking means, the post extending through the opening.

45. An apparatus for controlling discharge of fuel vapor and liquid fuel through an aperture in a fuel tank, the apparatus comprising a housing mounted in the aperture, the housing being formed to include a venting outlet, means for selectively preventing fuel vapor from flowing through the venting outlet, the preventing means including a diaphragm, means for communicating fuel vapor pressure from the fuel tank to the diaphragm, and a valve member sized to close the venting outlet and appended to the diaphragm for movement therewith, and means for using fuel vapor discharged from the venting outlet to provide a pressure cushion acting underneath the diaphragm, the using means including a skirt positioned beneath the diaphragm and surrounding the venting outlet, the skirt being formed to include chamber means for receiving fuel vapor discharged from the venting outlet and outlet means for restricting the flow of fuel vapor out of the chamber to a rate lower than the rate of flow of fuel vapor into the chamber so that fuel vapor accumulates in the chamber to provide the pressure cushion to assist in moving the preventing means to a position blocking flow of fuel vapor through the venting outlet.

46. The apparatus of claim 45, wherein the outlet means includes a plurality of openings spaced about the periphery of the skirt.

47. The apparatus of claim 45, wherein the skirt includes a cylindrical lower portion and a conical upper portion.

48. The apparatus of claim 47, wherein the outlet means is located on the lower portion.

49. An apparatus for controlling discharge of fuel vapor from a fuel tank, the apparatus comprising means for conducting fuel vapor between the fuel tank and a vapor-receiving device, first valve means for selectively blocking flow of fuel vapor through the conducting means, the first valve means being operable between a flow-blocking position and a flow-delivery position, means for yieldably biasing the first valve means towards its flow-blocking position, and means for using pressurized fuel vapor in the fuel tank having a pressure in excess of a predetermined threshold level to exert an opening force on the first valve means in opposition to the biasing means so that the first valve means is moved to its flow-delivery position, thereby permitting discharge of pressurized fuel vapor in the tank to the vapor-receiving device through the conducting means, and second vale means for preventing exposure of the using means to fuel vapor in the fuel tank in response to accumulation of fuel in excess of a predetermined volume during refueling to permit the first valve means to move to its flow-blocking position under forces generated by at least one of the biasing means and pressurized fuel vapor extant in the fuel tank during refueling.

50. The apparatus of claim 49, wherein the using means is formed to include a venting control chamber and means for communicating fuel vapor from the fuel tank to the venting control chamber so that pressurized fuel vapor extant in the venting control chamber having a pressure in excess of the predetermined threshold level exerts an opening-inducing force on the first valve means causing the first valve means to change to its flow-delivery position, thereby unblocking discharge of fuel vapor in the fuel tank to the vapor-receiving device via the conducting means.

51. The apparatus of claim 50, wherein the second valve means includes float valve means buoyantly supported in liquid fuel introduced into the fuel tank for selectively blocking flow of pressurized fuel vapor from the fuel tank into the venting control chamber through the communicating means.

52. The apparatus of claim 50, wherein the second valve means includes a valve member movable between a closed position blocking flow of pressurized fuel vapor through the communicating means and an open position allowing flow of pressurized fuel vapor through the communicating means, float means buoyantly supporting the valve member in liquid fuel introduced into the fuel tank for moving the valve member to its closed position upon accumulation of liquid fuel in excess of said predetermined volume in the fuel tank, and rollover means for moving the valve member to its closed position to block flow of liquid fuel through the communicating means at least during rollover of a vehicle containing the fuel tank.

53. The apparatus of claim 50, wherein the using means further includes means for bleeding pressure from the venting control chamber to the filler neck at a predetermined rate.

54. The apparatus of claim 49, wherein the using means includes an actuator member movable in a first direction to move the first valve means to its flow-delivery position in response to fuel vapor in the communicating means having a magnitude in excess of said predetermined threshold level and means for receiving pressurized fuel vapor expelled from the fuel tank in a closed chamber bounded in part by the actuator member, the closed chamber is situated in the vent means downstream of the first valve means, and the receiving means is formed to include means for regulating discharge of pressurized fuel vapor from the closed chamber to a downstream section of the conducting means to develop in the closed chamber a reserve of pressurized fuel vapor having a pressure sufficient to apply a force tending to move the actuator member in a direction opposite to the first direction.

55. The apparatus of claim 54, wherein the receiving means is formed to include at least one aperture sized to provide the regulating means.

56. An apparatus for controlling discharge of fuel vapor from a fuel tank, the apparatus comprising
means for conducting fuel vapor between the fuel tank and a vapor-receiving device,
first valve means for selectively blocking flow of fuel vapor through the conducting means, the first valve means being operable between a flow-blocking position and a flow-delivery position,
means for yieldably biasing the first valve means toward its flow-blocking position,
control means for receiving and using fuel vapor pressure from the fuel tank having a magnitude in excess of a predetermined threshold level to exert an opening force on the first valve mans in opposition to the biasing means so that the first valve means is moved to its flow-delivery position, thereby permitting discharge of pressurized fuel vapor in the tank to the vapor-receiving device through the conducting means, the control means being formed to include a venting control chamber and passageway means for conducting vapor from the fuel tank to the venting control chamber, and
second valve means for blocking flow of pressurized fuel vapor from the fuel tank to the venting control chamber through the passageway means in response to accumulation of fuel in the fuel tank in excess of a predetermined volume during refueling to permit the first valve means to move to its flow-blocking position under a closing force generated by pressurized fuel vapor in the fuel tank.

57. The apparatus of claim 56, wherein the control means includes an actuator member movable in a first direction to move the first valve means to its flow-delivery position in response to fuel vapor pressure in the venting control chamber in excess of a predetermined level and the venting control chamber is bounded in part by the actuator member.

58. The apparatus of claim 57, further including chamber means for receiving pressurized fuel vapor expelled from the fuel tank, the chamber means being positioned in the vent means downstream of the first valve means, and means for regulating discharge of pressurized fuel vapor from the chamber means to a downstream section of the conducting means to develop in the chamber means a reserve of pressurized fuel vapor to apply a force tending to move the actuator member in a direction opposite the first direction.

59. The apparatus of claim 58, wherein the regulating means is formed to include aperture means for communicating fuel vapor between the chamber means and the downstream section of the conducting means.

60. The apparatus of claim 56, wherein the control means is formed to include means for venting pressurized fuel vapor from the venting control chamber to a section of the conducting means downstream of the venting control chamber.

61. The apparatus of claim 56, wherein the second valve means includes a float valve buoyantly supported in liquid fuel introduced into the fuel tank, the float valve being movable between an open position allowing flow of fuel vapor from the fuel tank to the control means and a closed position preventing flow of fuel vapor from the fuel tank to the control means.

62. The apparatus of claim 61, wherein the second valve means includes rollover means for moving the float valve to its closed position to block flow of liquid fuel through the passageway means at least during rollover of a vehicle containing the tank.

63. An apparatus for controlling discharge of fuel vapor from a fuel tank, the apparatus comprising
means for conducting fuel vapor between the fuel tank and a vapor-receiving device, a first vale member movable between a flow-blocking position blocking flow of fuel vapor through the vent means and a flow-delivery position allowing flow of fuel vapor through the conducting means, means for yieldably biasing the first vale member toward its flow-blocking position, a pressure-responsive actuator assembly positioned for exposure to pressurized fuel vapor from the fuel tank, the actuator assembly including a pressure-responsive member and an actuation member connected to the pressure-responsive member for movement therewith, the pressure-responsive member having sufficient elasticity so that it moves when the pressure-responsive member is exposed to pressurized fuel vapor having a pressure in excess of a predetermined level to place the actuation member in engagement with the first valve member to move the first valve member in opposition to the biasing means to a flow-delivery position, and a second valve member movable between a closed position preventing exposure of the actuator assembly to pressurized fuel vapor from the fuel tank and an open position allowing exposure of the actuator assembly to pressurized fuel vapor from the fuel tank.

64. The apparatus of claim 63, wherein the first vale member includes an inverted cup defining an interior region and the biasing means extends into the interior region.

65. The apparatus of claim 63, further comprising at least to intersecting ribs positioned within the conducting means upstream of the first valve member to define a platform, the biasing means being positioned on the platform to act between the platform and the first vale member.

66. The apparatus of claim 63, wherein the conducting means is formed to include a venting control chamber bounded in part by the actuator assembly and a passageway extending between the fuel tank and the venting control chamber so that pressurized fuel vapor passes from the fuel tank through the passageway to the venting control chamber to act against the pressure-responsive actuator assembly.

67. The apparatus of claim 66, further comprising a valve seat against which the second valve member seats, the valve seat being positioned in the proximity of the passageway so that the second valve member blocks flow of fuel vapor through the passageway when the second valve member moves to its closed position in engagement with the valve seat.

68. The apparatus of claim 63, wherein the pressure-responsive member includes a diaphragm and the actuation member includes an attachment portion attached to the diaphragm and a rod depending from the attachment portion and bearing against the first valve member at least when the first valve member is in its flow-delivery position.

69. The apparatus of claim 63, wherein the conducting means is formed to include a chamber positioned to receive fuel vapor expelled from the fuel tank via the first valve means, and an annular skirt is positioned in the chamber, the annular skirt being formed to include at least one aperture allowing fuel vapor in the chamber to pass to a downstream section of the conducting means at a predetermined rate.

70. The apparatus of claim 63, wherein the second valve member includes a float valve buoyantly supported in liquid fuel introduced into the fuel tank.

71. The apparatus of claim 70, further comprising a rollover spring acting between the conducting means and the float valve to move the second valve member to the closed position to block flow of liquid fuel through the conducting means at least during rollover of a vehicle containing the fuel tank.

72. The apparatus of claim 71, wherein the float valve comprises an inverted cup defining an interior region and the rollover spring extends into the interior region.

* * * * *